BEST AVAILABLE COPY
NO PRINTED SPECIFICATION AVAILABLE
W. Wadsworth,
Brick Machine.
Patented June 26, 1835.
8,940x.
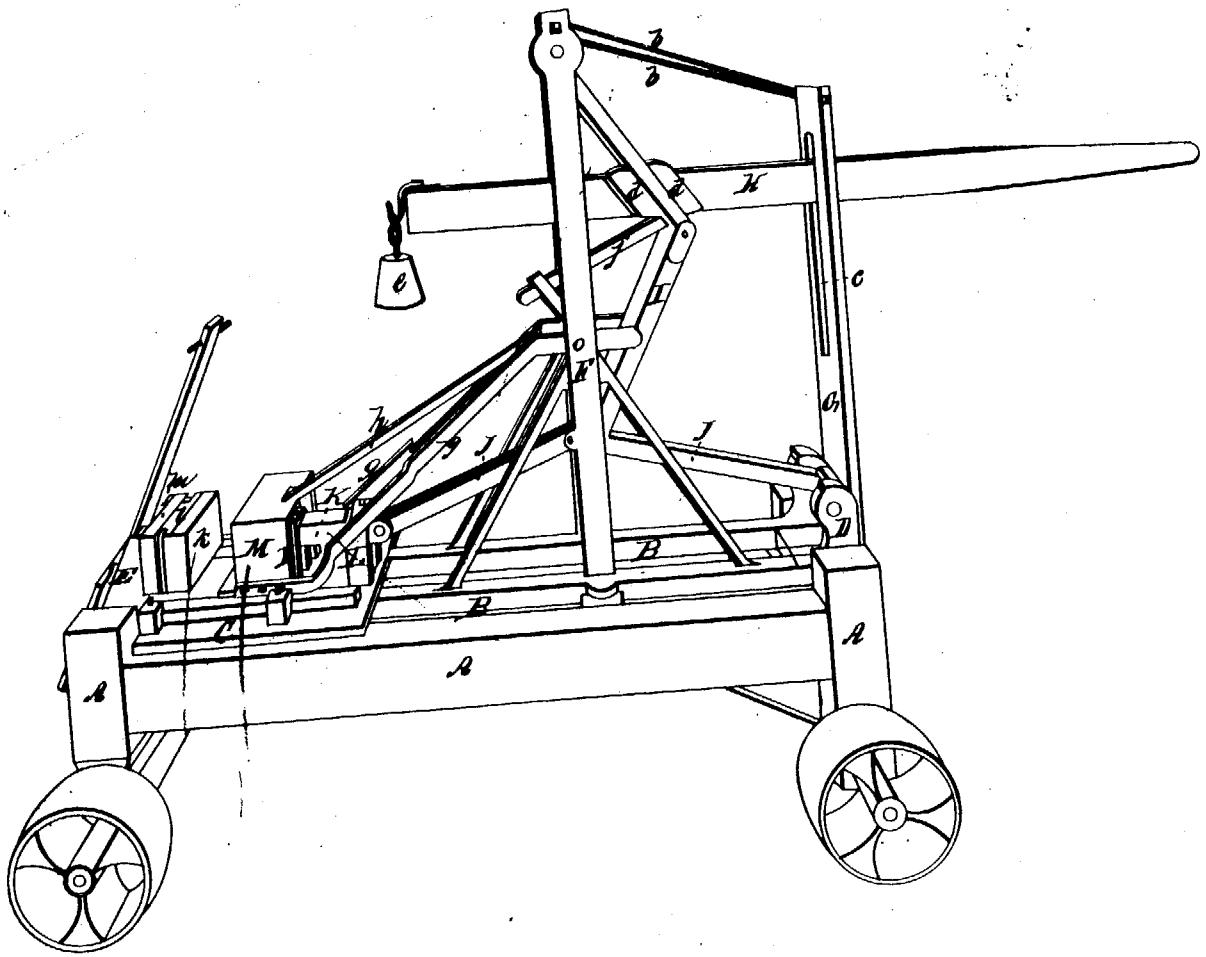

June 26 1835

8940x William Wadsworth
Letters Patent

The Schedule referred to in these Letters Patent and making part of the same containing a description in the words of the said William Wadsworth himself of his improvement in a machine for manufacturing pressed bricks called the Improved Brick Press.
To all people to whom these presents shall come, William Wadsworth of Hartford in the County of Hartford and State of Connecticut send greeting. Be it known that I the said William Wadsworth have invented, made [illegible] constructed and applied to use a new and useful improvement in a machine for manufacturing pressed brick which I call the Improved Brick press by which faced brick can be made in a more perfect and rapid manner than in any mode hitherto known and used. My improvement consists in a combination of machinery, all the separate parts of which may have been heretofore known or used separately or for other purposes and the new combinations for a new purpose to effect an improvement in a valuable art constitutes my invention for which I pray that the exclusive use may be secured to me according to the provisions of law. Herewith is forwarded to the Patent Office a Model and two sets of drawings by reference to which this specification can be readily understood. My machine is represented by the model and drawings as on four wheels, and it will be usually convenient to have it on wheels of convenient height, that it may be moved over the brick yard, that the bricks may be pressed by the spot where it is intended to deposit them. I make a substantial frame of [illegible] wood, cast iron or other material about five feet in length, and about twenty inches in width with strong posts at the corners & cross pieces, the front part being solid to meet the fixtures on the axletree about eighteen inches high from the bottom of the wheels. This frame must be sufficiently strong, and well fastened to support the machine, and the strain in the operation. The tops of the posts are raised about two & a half inches above the side

8940X side pieces and ends of the frame. The sides and ends of the frame
are marked A. A. A. A. across the side frame timbers under the upright
posts for sustaining the leaver H. is a strong cross piece of timber or
other material fastened to the side pieces of the frame by tenons or in
any other convenient mode, to strengthen and sustain the frame under
the upright posts. The end is seen in the drawing & marked a. The
frame must be made perfectly smooth on the top except the corners. &
B. B. are two pieces of cast iron or other suitable metal, which I call the
bed pieces. They may be about two or three inches deep & about two inches
wide or any other dimentions that on experience may be found expedi
-ent. They are about five inches apart and extend the whole length of the
frame to which they must be well secured. They are raised about three
quarters of an inch above the frame, except that part where the plate C. is
let into them. They must form a smooth surface with the plate C.
The ends of the bed pieces must be stout and strong and rise about
five and a half inches. The ends D. are perforated with one & a half inch
holes to receive the gudgeons on the stationary end of the horizontal toggle
joint, the ends E. rise about the same height. These ends and bed
pieces must be large and strong enough to bear the whole strain in
pressing the brick without trembling. C is a plate of cast iron or other
material seventeen inches long and nine inches wide, three quarters of
an inch deep and let into the bed pieces to form an even surface with them
this lies across the frame and bed pieces to which it is securely fastened.
This plate has wings extending from the outer edge of the front side of it, four
inches wide and ten inches long coming to the front end of the frame.
These wings lie on the outside of the bed pieces adjoining them and of
even hight with them. The use of this is to support the elevations L. L.
& P. P. likewise operates as a brace and supporter to the bed pieces.
H. is an upright sustaining post of cast iron or other suitable material
rising from one of the bed pieces about three feet six inches high. one other
similar post rises from the other bed piece. The edge of which is only vis
ible in the drawing, these must be connected by an iron bar at the top
just below which are circular enlargements of the posts through which...

8940X are one and a half inch holes to receive the gudgeons on the upper end of the
perpendicular toggle joint. G. is an upright wooden part at one end of
the machine riseing from the frame and connected with the former
named upright posts by rods b.b. to studdy it. In this wooden post is
a slot a through which passes the leaver H. This slot must extend high
enough to let the leaver rise to a level and low enough to let it decend
so far as to bring the toggle joints straight. H. is the leaver of wood or
other material that works the toggle joints and effects the presure
on the brick it passes through the upper part of the perpendicular tog-
gle joint just above its centre joint where it is secured fast. This tog
gle joint where the leaver passes through it is enlarged as is represented
on the drawing d. d. for the purpos of securing a better purches to the
lever - [illegible] c is a weight fastened to one end of the working leaver of
sufficient size to balance it I.I. is the perpendicular toggle joint which
turns on gudgeons passing through the upright sustaining posts jointed in
the middle in the usual manner and secured to the horizontal toggle
joint close by its center joint by a bolt on wich it works for this
purpos there is an elevation in the horizontal toggle joint of the
hight of one and a half inch. The center of this is cut down to receive
a tenon which is made on the lower end of the perpendicular toggle joint
through the elevation and tenon a hole is made of suitable dimentions
to receive a bolt to connect the toggle joint: on which bolt the per-
pendicular toggle joint works J.J. is the horizontal toggle joint
secured stationary at D. as before described but moveable at the attach
ed end where it is secured by a suitable mortice & tenon by a bolt
to the bar or follower K. the toggle joints are of cast iron or aney
other metal and of any required size A.A.A.A. are braces of cast
iron or other suitable material proceeding from the bed piece. To the
upright sustaining posts to strengthen them K is a moveable horizon
tal bar or follower secured at one end to the horizontal toggle joint
as aforesaid made of cast iron or other suitable material. The width
of three inches. The depth of two inches L.L. are two elevations of
cast iron or other suitable material. The one at the edge of the plate
C.

8940X

C. the other which in the drawing is nearly concealed by the mould.
There are two others similar to them on the other side of the plate. all
four of which are cast on the plate C.. they are raised high enough to
receive the moveable bar or follower X through which it passes in
spaces cut large enough for it to move freely in. secured in those spa-
ces by straps of iron passing over by screws in the tops of the elevations
marked. e, e, g g. is what I call the bridle & h. I call the brace. these
are made of wrought iron, are to move forward and back the mould
M. which receives and holds the brick while in the process of press-
ing. the bridle g. g. is fastened by bolts or screws to the outside of the
lower part of the mould M. on each side of it and the brace h. is in the
like manner fastened to the upper side of the mould. these rise in a
slope as appears by the drawing and model to the requisite hight where
they are firmly fastened together. There the brace stops and thence
the bridle pieces change their direction and procede back horizontal
ly over a roller between the upright sustaining posts marked O.
The sides of the bridle where it procedes horizontally are about two inches
apart at the commencement of the horizontal part. They are se-
cured by a permanent bolt back of which are two cast steel
rollers on which the dog i. fastened to the beam I plays. These rollers
are scarcely visible on the drawing, but may be readily understood
by the following description: they are placed about two inches apart be
tween the sides of the bridle supported by gudgeons passing through
the sides of the bridle so formed that they will readily turn round.
The dog d. at its lower end ordinarily acts between these two rollers.
The beam I. is attached to the perpendicular toggle joint one inch above
the centre joint, extending twelve inches parallel with it. The dog
i. is fixed on the beam by a socket and wedge to adjust it at pleas
ure in the manner represented by the model & drawing. When the
lever. H. is born down the lower end of the dog i. is brought against
the front roller between the sides of the bridle and carries it with the
mould M. forward til it encloses the block & which brings it to the
point where the pressure is given to the brick at which point the lower
end

8940X end of the dog rises over the front roller and presses freely so far as may
be necessary in conveying the working leaver to the lower end of the
slot C when the leaver is raised up. The lower end of the dog will
pass over the front and strike the back roller between the sides of the
bridle and bear it back to the position represented in the drawing
and with it the mould far enough to receive another brick for
pressure and then the dog will rest against the back roller and re-
main stationary till the downward pressure of the same will bring
the dog again in contact with the forward roller. The mould M.
is a box of two sides and two ends made of suitable thickness of cast iron or other materi-
al of the necessary thickness of the capacity required to inclose and hold
the brick to be pressed in three inches and three quarters in width lined
with iron & steel plates three sixteenths of an inch in thickness. on
the front bottom part of the mould is an apron two & a half inches
broad with an elevation on one end both serve for a support and
guide to the brick, and are even with the inner surface of the mould
and when the impress is given the brick they pass under and by the
plates k. a. m. at the end of the bar or follower H. which in the
drawing is concealed in the mould. M. is a cast iron plate three
quarters of an inch thick edged with iron and steel plates three
sixteenths of an inch thick fastened securely to the end of the bar
or follower H which shall exactly fill the mould M. k is a
cast iron plate of the same size as the one on the follower and edged
with iron & steel in the same manner over which the mould M.
shall pass when it is pressed forward by the dog i the plate l. cor
responds with the plate K as does plate m. The plate m is se
cured to the ends E. by solid and sufficient screws passing through
the end E. and the plates l. & k. are secured to the plate m by a
screw attached to the centre of plate l. passing through an ap
perture in the center of plate m by a nut and washer on the op
posite side. between the plates m & l. may be introduced at pleas
ure thin sheets of copper or sheet iron or any other material to regu
late at pleasure the thickness which is desired for the brick to be pres
sed

44.

8940X ed. The plate K is secured to plate C by screws one at each cor
ner. n. is a rail or slide of cast iron or other material cast on the
mould M moving with it. and p. p. are the elevations cut on the
plate C. on which it moves. there are corresponding rails and fix-
tures on the other side not exhibited on the drawing. By means of
this machinery on the drawing represented as open enough to
receive the brick to be pressed. the brick is to be placed betweene
the plate K and the mould M. which may readily be done so
that on moving the leaver H the mould M. shall pass over the
brick and enclose it perfectly so that it shall be in the mould be
tweene the plate K. and the one on the follower enclosed in the
mould. Then by pressing down the working leaver H. by hand
power. The two toggle joints will be reduced till they are
both made perfectly straight. The horizontal toggle joint being
entirely level and the perpendicular toggle joint being per
fectly straight betweene the two upright sustaining posts.
This pressure will gradually increase and at the point where it
terminates it will be enough by the ordinarily pressure of a sin
gle hand on the leaver to give a power and pressure on the
brick almost beyond calculation and enough to press the brick
to any desired degree. In Testimony that the foregoing is a true
specification of my said improvement I have hereunto set
my hand this eighteenth day of March in the year of our Lord
one thousand eight hundred and thirty five.

Witnesses — William Wadsworth.

Alpheus Bigelow Jr

Augustus Peabody — 2632 [illegible]

Drawing

[illegible]